April 29, 1958
K. R. DURST
2,832,442
HYDRAULIC BRAKE STRUCTURE
Filed April 20, 1955
2 Sheets-Sheet 1
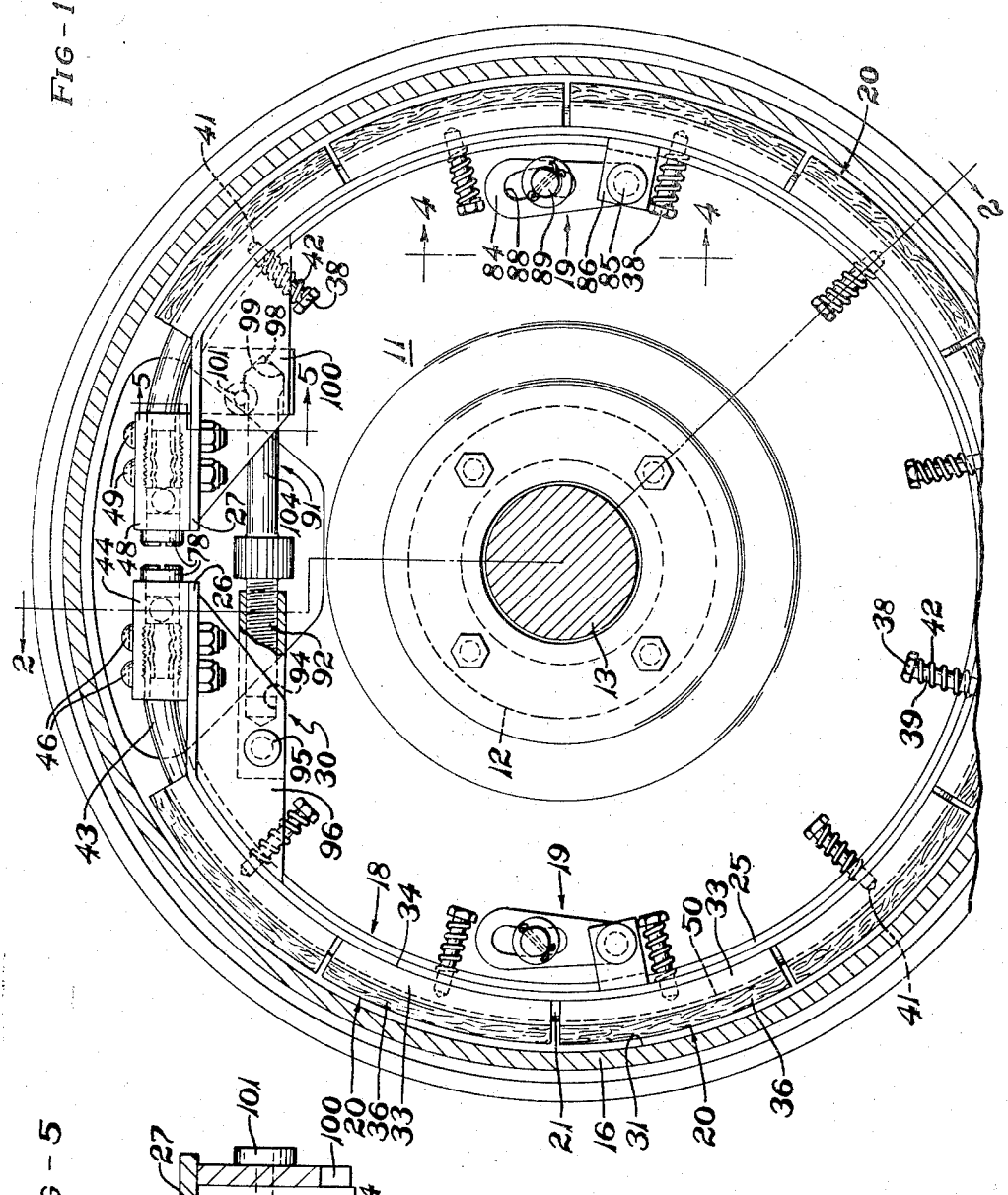
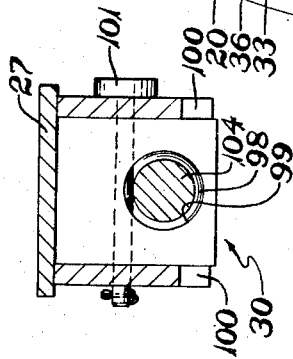
INVENTOR.
KENNETH R. DURST
BY
John W. Haney
ATTY.

April 29, 1958
K. R. DURST
2,832,442
HYDRAULIC BRAKE STRUCTURE
Filed April 20, 1955
2 Sheets-Sheet 2
FIG-2
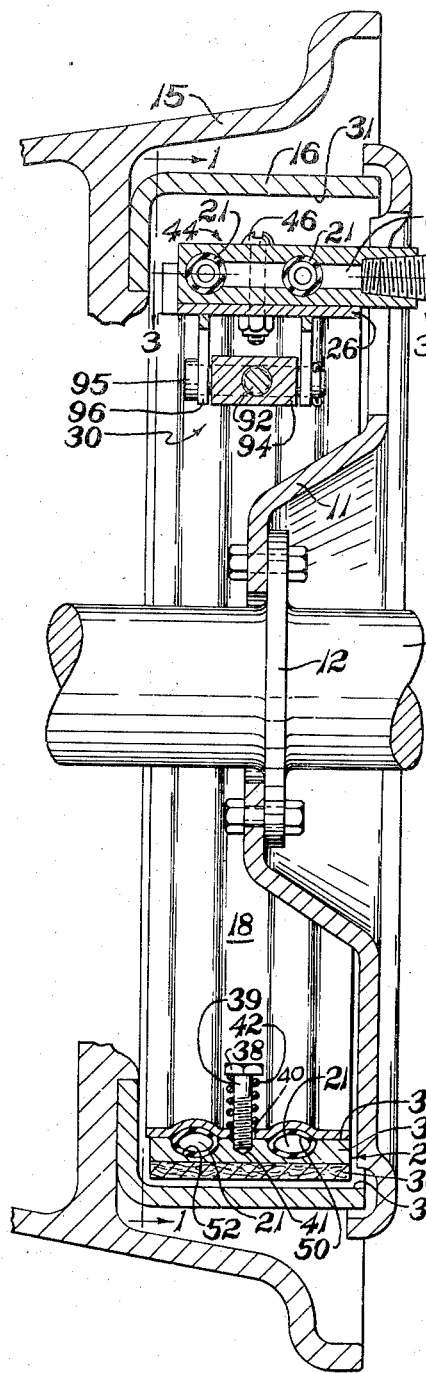
FIG-4
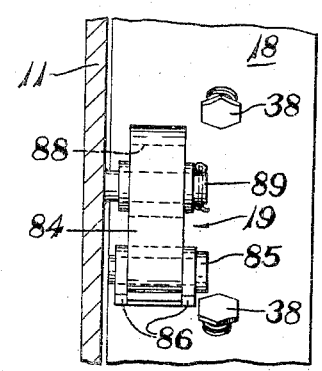
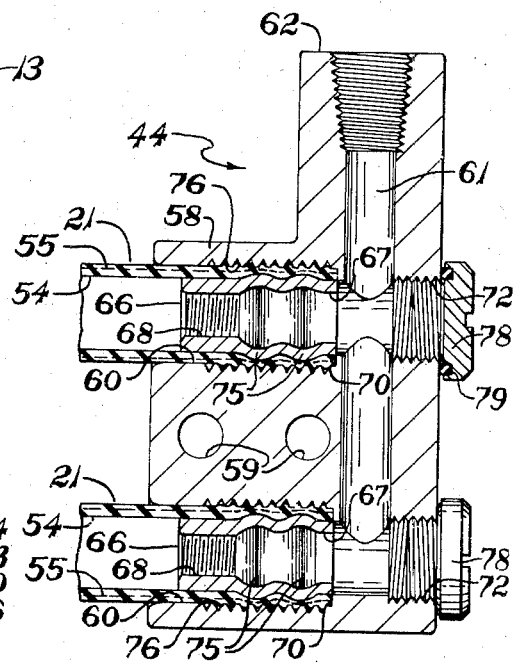
FIG-3
INVENTOR.
KENNETH R. DURST
BY
John D. Haney
ATTY.

United States Patent Office 2,832,442
Patented Apr. 29, 1958

2,832,442

HYDRAULIC BRAKE STRUCTURE

Kenneth R. Durst, Troy, Ohio, assignor to The B. F. Goodrich Company, New York, N. Y., a corporation of New York Application April 20, 1955, Serial No. 502,549

6 Claims. (Cl. 188—78)

This invention relates to hydraulic brakes, and more particularly to improved brake construction of the general class in which the braking members are actuated radially relative to the rotational axis of a brake drum mounted to a wheel with which the brake is associated.

The brake construction of this invention embodies the advantageous mechanical features of the well known expander-tube brakes together with certain additional features which make this brake construction especially suitable for automotive vehicles. The brake of this invention provides for the application of a uniform braking force substantially throughout the circumferential extent of the drum, and for greater durability of the lining friction material as compared with other type brakes of comparable energy rating, and it operates effectively with comparatively low hydraulic pressures. Additionally, this brake construction requires materially less fluid displacement to energize it than has been heretofore required in expander tube brakes of similar energy rating. It can be manufactured considerably more economically and is of lighter weight than such expander tube brakes, and it operates with equal effectiveness when the brake drum is rotating in either direction relative to the braking members.

The brake structure of this invention includes a carrier member upon which brake shoes are supported in radially spaced relation to a brake drum. The carrier is a generally annular member which is split transversely at one position in its circumference and it is supported by a non-rotatable torque frame which may be rigidly secured to an axle or the like. The brake shoes are movable radially away from the carrier into engagement with the brake drum by one or more narrow hose-like distensible tubular members which extend circumferentially around the carrier from each of the ends formed by the transverse opening in the carrier. Each tubular member is preferably generally elliptical in cross-section, and is distensible toward a generally circular cross-sectional shape by fluid pressure when the brake is energized to urge the brake shoes into friction engagement with the drum. Means is provided to adjust the position of the carrier and the brake shoes relative to the brake drum by varying the spacing between the ends of the carrier at the point at which it is divided transversely to compensate for wear occurring in the brake shoes.

The invention will be further described with reference to the accompanying drawings which illustrate a brake construction made in accordance with and embodying this invention.

In the drawings:

Fig. 1 is an elevational view of the brake structure along a plane indicated by the line 1—1 of Fig. 2;

Fig. 2 is a cross-sectional view taken on the line 2—2 of Fig. 1;

Fig. 3 is a sectional view of one of the preferred type fluid manifold connections taken along a plane indicated by the line 3—3 of Fig. 2; and Figs. 4 and 5 are fragmentary detail views taken on the line 4—4 and 5—5 respectively, of Fig. 1.

The brake structure includes a non-rotatable torque frame 11 fastened to a flange 12 on an axle 13 upon which a wheel structure 15 may be mounted. The wheel structure includes a brake drum 16 rotatable with the wheel relative to the non-rotatable torque frame and the axle. For the purpose of this invention the torque frame may be secured in a variety of different ways to a suitable non-rotatable structure in a position generally coaxial of the brake drum.

Major components of the brake structure in addition to the torque frame 11 and the brake drum 16 include a carrier 18 supported by torque links 19 from the torque frame 11 so that the carrier is concentrically disposed within the brake drum; a series of arcuate brake shoes 20 mounted on the carrier; and a pair of expansible hose-like tubular members 21 extending circumferentially around the peripheral surface of the carrier between the carrier and the brake shoes. The brake shoes 20 are normally seated on the carrier in the deenergized condition of the brake and are urged radially away from the carrier 18 into frictional engagement with the brake drum 12 by distension of the tubular members.

The brake shoe carrier 18 (see Fig. 1) includes an annular body portion 25 which is generally concentric with the brake drum 16 and which is divided transversely to provide a pair of end portions 26 and 27. Each of these end portions extends generally chordially of the annular body portion 25 in laterally-spaced, opposed relation to each other and these ends are interconnected across the gap between them by an adjuster mechanism 30 which is operable as hereinafter explained to widen or narrow the gap between the ends 26 and 27 of the carrier, thereby varying the diameter of the annular body portion 25. In this manner the brake shoes may be adjusted radially of the brake drum to a position in which they may be moved into engagement with the brake drum by the distension of the tubular members 21. The body portion of the carrier is comparatively thin in radial direction, making it somewhat flexible and sufficiently resilient to permit this adjustment. The axial width of the carrier is approximately equal to the axial width of the braking surface 31 of the brake drum. The carrier may be fabricated by rolling a steel strip into the required annular shape or it may be made from a light metal such as aluminum, or it may be a molded plastic composition of sufficient rigidity and resilience.

The friction brake shoes 20 are seated end to end along the exterior peripheral surface of the annular body portion of the carrier and are shaped arcuately in longitudinal cross-section so that they are generally concentric with the brake drum and with the body portion of the carrier. Each of the brake shoes is preferably formed of a cast metal base portion 33 having a concave inner face 34 which is seated on the carrier in the deenergized condition of the brake, and a convexly curved friction lining material 36 secured to the base portion to engage the face 31 of the brake drum when the brake is energized. Each shoe is connected to the carried by a stud 38 which extends radially through the carrier and which is threaded into the concave face 34 of the brake shoe. The studs are formed with a smooth shank 39 which extends through a radial opening 40 in the carrier (see Fig. 2) and each terminates in a threaded tip 41 which is threaded into a suitable tapped opening into the brake shoe. The brake shoes are maintained normally seated against the carrier by coil retractor springs 42 each of which surrounds the smooth shank of its respective studs 38 and is maintained under substantial compression between the head of the stud and the carrier. When the brake shoes are urged against the brake drum by the tubular members 21 the shank portion 39 of each stud slides through the hole 40 in the carrier thereby compressing the springs 42 and guiding the movement of the shoes. Each of the studs 38 additionally transfers braking torque from the brake shoes to the carrier and to the torque frame when the brake is energized.

The tubular members 21 each have one end 43 secured to a fluid-supplying manifold 44 (see Fig. 1) mounted by the bolts 46 on the end 26 of the carrier. The tubular members extend circumferentially around the annular body portion 25 of the carrier and terminate in a second manifold 48 secured on the opposite end 27 of the carrier by bolts 49. The tubular members 21 extend parallel of each other in laterally-spaced relation and each is seated in a comparatively shallow peripheral groove 50 (see Fig. 2) extending around the periphery of the body portion of the carrier from the manifold 44 to the manifold 48 at the opposite end of the tubular members. As shown in Fig. 2, each of the brake shoes is provided with a laterally-spaced pair of grooves 52 extending longitudinally along the concave face 34 of each shoe into which the tubular members project. When the brake shoes are seated on the carrier, the grooves 52 of the brake shoes register with the corresponding grooves 50 of the carrier to define a passage enclosing the tubular members. In the deenergized condition of the brake the passage defined by the registering grooves of the brake shoes and the carrier is generally elliptical in cross-section with the major axis of the elliptical shape extending axially of the brake drum, hence the tubular members confined therein also have a generally elliptical cross-sectional shape. Preferably the cross-sectional shape in which the tube is maintained is such that its major axis is substantially greater than the minor axis but preferably the tubes are not completely flattened to the extent that marginal creases would be formed in the walls of the tubes.

The tubular members 21 are preferably fabric-reinforced tubes of rubber-like material which may be manufactured by conventional hose-building techniques. Preferably each includes a rubber inner tube 54 (Fig. 3) with a suitable fabric reinforcement 55 about the exterior of the tube which may be wrapped or braided or the like upon the inner tube. The tubular members are preferably cured in the elliptical cross-sectional shape they will normally occupy in the brake structure when the brake is deenergized. The tubes therefore will assume the shape of the passage between the brake shoes and the carrier when fluid pressure is relieved inside them, and it is unnecessary to utilize the retractor spring force to collapse the tubes.

Each of the manifolds 44 and 48 to which the opposite ends of the tubes are connected includes a rigid metal housing 58 (see Fig. 3) having holes 59 through it to receive mounting bolts 46 or 49. In the housing there is a pair of parallel internally serrated passages 60 into which the ends of the tubular members 21 project and an additional passage 61 transverse to the parallel passages to provide communication between the ends of the tubular members. The transverse passage 61 extends to a sidewall 62 of the manifold. In the manifold 44, a conduit 64 is connected with the mouth of passage 61 through which conduit hydraulic fluid from a fluid pressure generator (not shown) of the vehicle is supplied. In the manifold 48 (which may be identical in structure with manifold 44) the mouth of passage 61 is preferably capped closed. Preferably fluid pressure is supplied to the tubular members 21 only through the manifold 44. The transverse passage 61 interconnecting the ends of the tubular members in manifold 48 permits equalization of pressure of the fluid in the two passages.

The ends of the tubular members 21 are anchored in their respective passages 60 in each manifold by axially distortable internal fasteners 66 which preferably are the type known as "Rivnut" fasteners manufactured by The B. F. Goodrich Company. The fasteners are generally hollow metal articles which, prior to their installation, are cylindrical and have a comparatively smooth bore 67 through one end and internal threads 68 at the opposite end. The wall portion of the fasteners in which the threads 68 are formed is of slightly thicker gauge than the remaining wall portion. To secure the tubular members 21 in their respective passages, the fasteners 66 are inserted into the ends of the tubes 21 and then the ends of the tubes are inserted into the passages 60 until the end faces of the tubes are seated against a shoulder 70 within each passage. An upsetting tool (not shown) is then inserted into the fasteners through access ports 72 located coaxially of the passages 60. The tool may be a conventional Rivnut upsetting tool which engages the threads 68 and includes a mandrel (not shown) which abuts the end face of the fastener flush with the end face of the hose. The operation of the upsetting tool is such that it imparts an axial compressive load on the fastener. The axial pressure causes the thin wall portion of the fasteners to bulge outwardly as indicated at numeral 75 thereby squeezing the walls of the tubes tightly against the walls of the passages. Additional gripping engagement of the hose is contributed by the serrations 76 on the walls of the passages. After the upsetting operation the tool is disengaged from the threads 68 of the fastener and withdrawn from the access ports and then the access ports are capped with threaded plugs 78 which include a suitable sealing ring 79 to prevent leakage of fluid around the plugs. The ports 72 may also serve as bleeder ports in adjusting the brake. This connection for the flexible tubular member 21 is capable of withstanding fluid pressures in the order of 1500 p. s. i. both statically and cyclically applied and temperatures in excess of 300° F. without leakage. This mode of connecting one or more hoses to a non-yielding housing is the subject of a copending application of Paul F. Black et al., Serial No. 504,748, filed April 29, 1955.

Details of the preferred torque links 19 for connecting the carrier 18 to the torque frame 11 are best shown in Figs. 1 and 4. Each torque link 19 includes a lever 84 having one end pivotally secured by a pivot pin 85 between a pair of clevis bars 86 on the interior surface of the carrier 18. The opposite end of each of the levers 84 is provided with an arcuate slot 88 which is generally concentric with the curvature of the body portion of the carrier and through which slot extends a rigid pivot pin 89 which projects outwardly from the torque frame 11. When the brake is energized, the carrier will rotate slightly to the extent permitted by the arcuate slots upon initial contact of the brake shoes and the drum until one end of the arcuate slot engages the rigid pin 89 thereby locking the carrier rigidly relative to the torque frame. Thereafter the braking torque imposed on the brake shoes is transmitted through the radial studs 38 to the carrier 18 and through the torque links 19 to the rigid torque frame 11. This slight rotary movement of the carrier advantageously protects the brake shoes from scuffing and the like at the instant they are engaged with the drum. In the deenergized condition of the brake, the carrier is positioned such that the pin 89 projects through the slot about intermediate the ends of the slot. Hence, the action of the brake carrier is identical regardless of whether the brake drum is rotating clockwise or counter-clockwise with respect to the position of it as shown in Fig. 1.

The adjustment mechanism 30 includes a straight stud member 91 having a threaded shank 92 which is threaded into a socket member 94 secured to the end 26 of the carrier mechanism. The socket member 94 is pivotally supported by a bolt 95 between a pair of downwardly-extending laterally-spaced flanges 96 located below the end 26 of the carrier and which extend to the body portion of the carrier to reinforce the end 26 of the carrier. The other end of the stud 91 terminates in a ball member 98 and is retained in a ball socket 99 secured between a pair of downwardly-extending flanges 100 immediately below end 27 of the carrier by a bolt 101 (see Fig. 5). The stud 91 includes a shank 104 intermediate the ends of the stud to enable the stud to be threaded into and out of the socket member 94. The primary function of the adjustment mechanism is to adjust the diameter of the body portion of the carrier to position the brake shoes relative to the drum so that the brake shoes are engaged with the brake drum solely by the distention of the tubular member. As the brake shoes are progressively worn, it becomes necessary to adjust the position of the brake shoes by threading the stud 91 out of its mating socket 94 to increase the diameter of the body portion. Various adjustment mechanisms may be employed in lieu of the mechanism illustrated including hydraulic automatic adjusters incorporated into the fluid supply system.

In summary, the brake is installed and the carrier is adjusted by the mechanism 30 so that the brake shoes will be in a position radially inward from the brake drum which is less than the total distance by which the brake shoes may be urged radially by the tubular members plus the additional distance through which the brake shoes must be moved to compensate for thermal expansion of the brake drum. When the brake is energized, fluid introduced to the manifold 44 distends the tubes 21 which urge the brake shoes radially against the drum. The braking torque on the brake shoes is transmitted through the studs 38 to the carrier and torque links to the torque frame. The carrier structure is sufficiently rigid to withstand the reaction of the outward pressure of the brake shoes against the drum. The body portion of the carrier is readjusted by mechanism 30 when the brake shoes have worn sufficiently that the distension of the tubes is not capable of bringing the shoes against the drum with adequate pressure.

Since the drum may be engaged throughout substantially its complete periphery except for the comparatively small sector of the drum in which the manifolds are positioned, the unit pressure on the lining faces is comparatively low and hence the linings wear considerably longer than the brakes of prior design. Further, since the carrier carries the reaction load of the brake shoes in compression it may be of light construction and still withstand these loads. The pair of tubular members apply braking pressure to the brake shoes throughout the arcuate extent of the brake shoes and adjacent the margins of the shoes. Hence, the braking pressure is substantially uniformly distributed on the face of each brake shoe so that the brake shoes do not tend to bow or become distorted.

Variations in the structure disclosed may be made within the scope of the appended claims.

I claim:

1. A hydraulic brake structure comprising a rotatable annular brake drum, a non-rotatable rigid torque frame, a brake shoe carrier disposed concentrically and in radially spaced relation to said drum, means engaging said carrier to said torque frame, a series of brake shoes supported on the carrier intermediate the carrier and the brake drum, means connecting each of said shoes to the carrier for radial movement of the shoes toward and away from the carrier, springs normally maintaining said shoes in a position away from the brake drum, a pair of distensible tubular hose members extending circumferentially around the carrier and underlying said brake shoes, the hose members being of generally oblong cross-sectional shape in the deenergized condition of the brake with the major axis of the oblong shape disposed generally axially of the brake drum and each hose member being circumferentially discontinuous, a manifold at each end of each of the hose members to which manifolds the ends of the hoses are secured, each manifold being secured to the carrier and one of the manifolds being adapted to conduct fluid under pressure to said hose members to distend said hose members and urge said brake shoes radially against the drum, and said carrier being divided transverse to its circumference intermediate said manifolds, and means at the transverse division of the carrier for adjusting the diameter of the carrier to regulate the radial position of the brake shoes relative to the drum.

2. A hydraulic brake structure comprising a rotatable annular brake drum, a non-rotatable rigid torque frame, an annular brake shoe carrier supported by said torque frame in radially spaced relation to said drum, the carrier having an annular body portion generally concentric to said annular drum and extending continuously from a first end to an opposite end spaced from but closely adjacent said first end, a first manifold secured to said first end of the drum, a second manifold secured to the opposite end of the carrier, an expansible tubular member extending circumferentially around said carrier from said first manifold to said second manifold, said tubular member having a normally generally oblong cross-sectional shape in the deenergized condition of the brake and being seated on the carrier between said carrier and the brake drum and having the major axis of its oblong cross-sectional shape disposed axially of the brake drum, a series of brake shoes positioned on the carrier each overlying said tubular member, means connecting said brake shoes to said carrier for movement of the brake shoes relative to the carrier radially of the drum and for normally maintaining said shoes in position radially away from the drum in the deenergized condition of the brake, fluid supply means connected to said first manifold to supply fluid to said tubular member to distend said member and urge the said shoes radially against the brake drum, and means engaging said opposed ends of the carrier to adjust said ends to regulate the position of the brake shoes relative to the drum.

3. A hydraulic brake structure comprising a non-rotatable rigid torque frame, an annular circumferentially discontinuous brake shoe carrier supported by the torque frame, the carrier having a generally annular body portion extending continuously from a first end disposed generally chordally of the body to an opposite end closely adjacent said first end and disposed chordally of the body portion of the carrier, a first manifold secured to the first end of the carrier, a second manifold secured to the said opposite end of the carrier, a pair of laterally spaced expansible tubular members each having one end secured to said first manifold and circumferentially encircling the body portion of the carrier and having their opposite ends secured to said second manifold, the tubular members being interconnected with each other at said first manifold and said second manifold, a circumferential groove in said carrier to receive each of said tubular members, a series of brake shoes supported on the carrier each overlying said tubular members, grooves in each brake shoe registering with the corresponding grooves of said carrier to define a passage surrounding each said tubular member, the tubular members having a generally oblong cross-sectional shape in the deenergized condition of the brake, means for supplying fluid to each of said manifolds to distend said tubular members and urge said brake shoes radially against the brake drum, and means interconnecting said ends of the carrier for varying the diameter of said annular body portion of the carrier.

4. In a hydraulic brake structure, a non-rotatable rigid torque frame, a circumferentially discontinuous carrier supported by the torque frame, the carrier having a generally annular body portion extending continuously from a first end of the carrier to a second end of the carrier, a distensible tubular member having one end engaged with said first end of the carrier and extending circumferentially around the body portion of the carrier and terminating at an opposite end secured to said second end of the carrier, a series of brake shoes supported on the body portion of the carrier overlying said tubular member, means connecting each said brake shoe in torque-transmitting engagement with the carrier, means for supplying fluid pressure to said tubular member to distend said member and urge said brake shoes radially from said carrier, and means to regulate the diameter of said body portion of the carrier to take up wear in the brake shoes.

5. A hydraulic brake structure for operation with a rotatable brake drum, the brake structure comprising a non-rotatable torque frame, a generally annular circumferentially discontinuous brake shoe carrier supported by the torque frame, said carrier terminating in closely spaced-apart end portions, a fluid distensible tube extending continuously along said carrier and terminating in ends fastened to said end portions of the carrier, a series of brake shoes positioned on said carrier overlying said tube, means connecting each said brake shoe in torque-transmitting engagement with the carrier, means to supply fluid pressure to said tube to distend said tube and displace said brake shoes radially toward a position in which they are frictionally engaged with the brake drum, means connecting said carrier to said torque frame to provide restricted rotary movement of the carrier relative to the torque frame in a direction circumferentially of the carrier in response to torque transmitted to the carrier by the engagement of the brake shoes with the drum, spring means for opposing said radial displacement of each brake shoe, and means for adjusting the spacing between said end portions of the carrier to regulate the position of the brake shoes relative to the drum when the brake is de-energized.

6. In a hydraulic brake structure for operation with a rotatable brake drum, a non-rotatable torque frame, a generally annular circumferentially discontinuous brake shoe carrier supported by the torque frame, a fluid distensible tube extending circumferentially around said carrier and having opposing end portions attached to the carrier, a series of brake shoes positioned on said carrier overlying said tube, means connecting each said brake shoe in torque-transmitting engagement with the carrier, means for supplying fluid pressure to said tube to distend said tube and displace said brake shoes radially toward a position in which they are frictionally engaged with the brake drum, spring means for opposing said radial displacement of each brake shoe, means for adjusting the diameter of the carrier to regulate the radial position of the shoes relative to the drum and means connecting said carrier to said torque frame to provide restricted rotary movement of the carrier relative to the torque frame in a direction circumferentially of the carrier in response to torque transmitted to the carrier by the engagement of the brake shoes with the drum.

References Cited in the file of this patent

UNITED STATES PATENTS

| 2,174,724 | Hunter | Oct. 3, 1939 |
| 2,193,481 | Fawick | Mar. 12, 1940 |
| 2,226,457 | Whittingham | Dec. 24, 1940 |
| 2,388,151 | Hunter | Oct. 30, 1945 |

FOREIGN PATENTS

| 681,282 | Great Britain | Oct. 22, 1952 |
| 701,692 | Germany | Jan. 22, 1941 |